United States Patent
Micka et al.

(10) Patent No.: US 7,188,222 B2
(45) Date of Patent: Mar. 6, 2007

(54) METHOD, SYSTEM, AND PROGRAM FOR MIRRORING DATA AMONG STORAGE SITES

(75) Inventors: William Frank Micka, Tucson, AZ (US); Gail Andrea Spear, Tucson, AZ (US); Robert Francis Bartfai, Tucson, AZ (US); Sam Clark Werner, Tucson, AZ (US); Thomas Charles Jarvis, Tucson, AZ (US); Warren K. Stanley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 10/674,845

(22) Filed: Sep. 29, 2003

(65) Prior Publication Data

US 2005/0071710 A1    Mar. 31, 2005

(51) Int. Cl.
*G06F 12/16* (2006.01)
*G06F 11/00* (2006.01)

(52) U.S. Cl. .................................. 711/162; 714/15
(58) Field of Classification Search .............. 714/15; 711/162
See application file for complete search history.

(56) References Cited

U.S. PATENT DOCUMENTS

| | | |
|---|---|---|
| 4,750,106 A | 6/1988 | Aiken, Jr. |
| 5,325,528 A | 6/1994 | Klein |
| 5,504,861 A | 4/1996 | Crockett et al. |
| 5,592,618 A * | 1/1997 | Micka et al. .................. 714/54 |
| 5,720,029 A * | 2/1998 | Kern et al. .................... 714/20 |
| 6,052,797 A | 4/2000 | Ofek et al. |
| 6,199,074 B1 | 3/2001 | Kern et al. |
| 6,282,635 B1 | 8/2001 | Sachs |
| 6,327,671 B1 | 12/2001 | Menon |
| 6,442,709 B1 | 8/2002 | Beal et al. |
| 6,467,024 B1 * | 10/2002 | Bish et al. .................. 711/114 |
| 6,499,112 B1 | 12/2002 | Mililo et al. |
| 6,553,509 B1 | 4/2003 | Hanson et al. |
| 7,013,372 B2 * | 3/2006 | Achiwa et al. ............. 711/162 |
| 2003/0041280 A1 | 2/2003 | Malcolm et al. |

* cited by examiner

*Primary Examiner*—Matthew Kim
*Assistant Examiner*—Shane M. Thomas
(74) *Attorney, Agent, or Firm*—David W. Victor; Konrad Raynes & Victor LLP

(57) ABSTRACT

Provided are a method, system, and program for forming a consistency group of data. A command is received to form a consistency group with respect to data received at a first storage site that is mirrored to a second storage site. A first data structure is provided indicating updates to the first storage site not included in the consistency group that are received after the command and a second data structure is provided indicating updates to the first storage site in the consistency group to be formed. A command is transmitted to cause data copied to the second storage site that is part of the consistency group to be copied to a third storage site. Indication is received when the data in the second storage site that is part of the consistency group is copied to the third storage site.

30 Claims, 8 Drawing Sheets

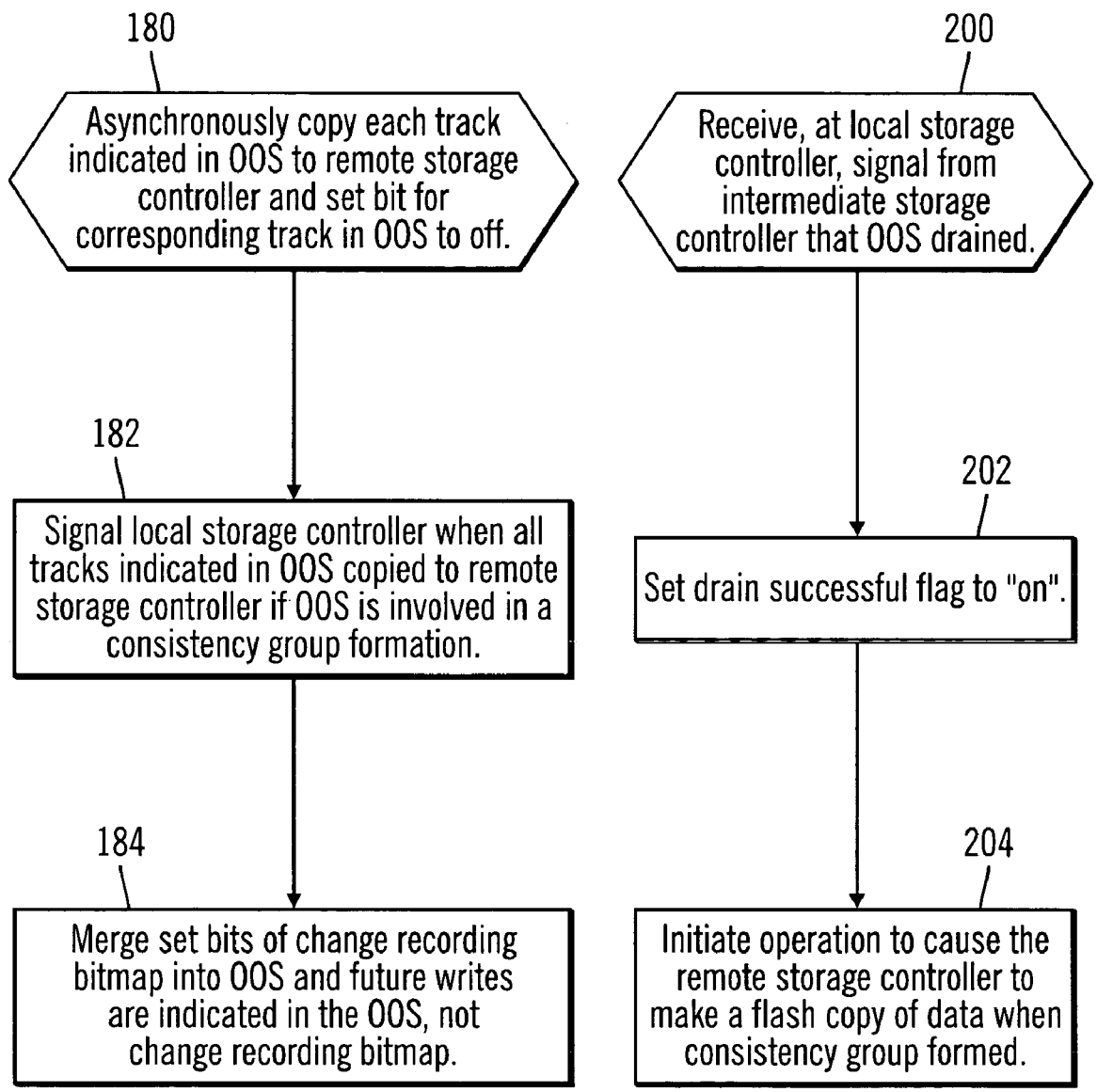

METHOD, SYSTEM, AND PROGRAM FOR MIRRORING DATA AMONG STORAGE SITES

BACKGROUND OF THE INVENTION

1. Field of the Invention

The present invention relates to a system, method, and program for mirroring data among storage sites.

2. Description of the Related Art

Disaster recovery systems typically address two types of failures, a sudden catastrophic failure at a single point in time or data loss over a period of time. To assist in recovery of data updates, a copy of data may be provided at a remote location. Such dual or shadow copies are typically made as the application system is writing new data to a primary storage device. International Business Machines Corporation (IBM), the assignee of the subject patent application, provides the following systems for maintaining remote copies of data at a secondary site, Extended Remote Copy (XRC) and Peer-to-Peer Remote Copy (PPRC). These systems provide a method for the continuous mirroring of data to a remote site to failover to during a failure at the primary site from which the data is being continuously mirrored. Such data mirroring systems can also provide an additional remote copy for non-recovery purposes, such as local access at a remote site. The IBM XRC and PPRC systems are described in the IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The host system time stamps data sets when writing such data sets to volumes in the primary DASD. The integrity of data updates is related to insuring that updates are done at the secondary volumes in the volume pair in the same order as they were done on the primary volume. In XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage devices. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

One technique to maintain consistency across copies is to timestamp data across primary volumes using a common clock source, referred to as a SYSPLEX timer. Updates will be transferred in groups defined as all updates having a timestamp less than a certain time. When clock synchronization cannot be easily implemented to form consistency groups across systems, then another technique for forming consistency groups is to determine a cut-off time. Any updates to primary volumes managed by the primary controller cache dated as of the that cut-off time are transferred to the secondary controller for storage in the secondary volumes. While transferring the data in the consistency group, the primary storage controller would return busy to any host requests while the data in the consistency group is transferred. After the data in the consistency group is transferred and the primary and secondary storage controller are synchronized, i.e., any updates whose timestamp is less than the cut-off time, then the primary controller would cease returning busy to the applications. This ensures that the primary and secondary volumes are consistent as of the cut-off time for the consistency group.

SUMMARY OF THE PREFERRED EMBODIMENTS

Provided are a method, system, and program for forming a consistency group of data. A command is received to form a consistency group with respect to data received at a first storage site that is mirrored to a second storage site. A first data structure is provided indicating updates to the first storage site not included in the consistency group that are received after the command and a second data structure is provided indicating updates to the first storage site in the consistency group to be formed. A command is transmitted to cause data copied to the second storage site that is part of the consistency group to be copied to a third storage site. Indication is received when the data in the second storage site that is part of the consistency group is copied to the third storage site.

In further implementations, a failure is detected at the second storage site and a determination is made as to whether the data in the consistency group was copied to the third storage site. The updates at the first storage site indicated in the first data structure are copied to the third storage site after determining that the data in the consistency group was copied to the third storage site.

Yet further, the first and second storage sites may be separated by a first distance and the second and third storage sites are separated by a second distance, wherein the second distance is substantially greater than the first distance.

Provided are a method, system, and program for forming a consistency group of updates received at a first storage site. Updates are received at a second storage site updates from the first storage site. A first data structure is provided indicating updates at the second storage site to copy to a third storage site. A command is received to form a consistency group and a second data structure at the second storage site is used to indicate updates received from the first storage site after receiving the command that are not included in the consistency group to be formed. The first storage site is signaled in response to copying the updates in the consistency group indicated in the first data structure to a third storage site.

In still further implementations, a determination is made as to whether the second data structure is being used to indicate updates from the first storage site not in one consistency group in response to receiving the command to form the consistency group. Indications of updates in the first and second data structures are merged in the first data structure in response to receiving the command to form the consistency group and determining that the second data structure is being used to indicate updates from the first storage site not in one consistency group. Indication is made in the second data structure of updates from the first storage site received after merging the first and second data structure.

BRIEF DESCRIPTION OF THE DRAWINGS

Referring now to the drawings in which like reference numbers represent corresponding parts throughout:

FIGS. 4–9 illustrates operations performed by storage controllers to copy data among storage sites in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
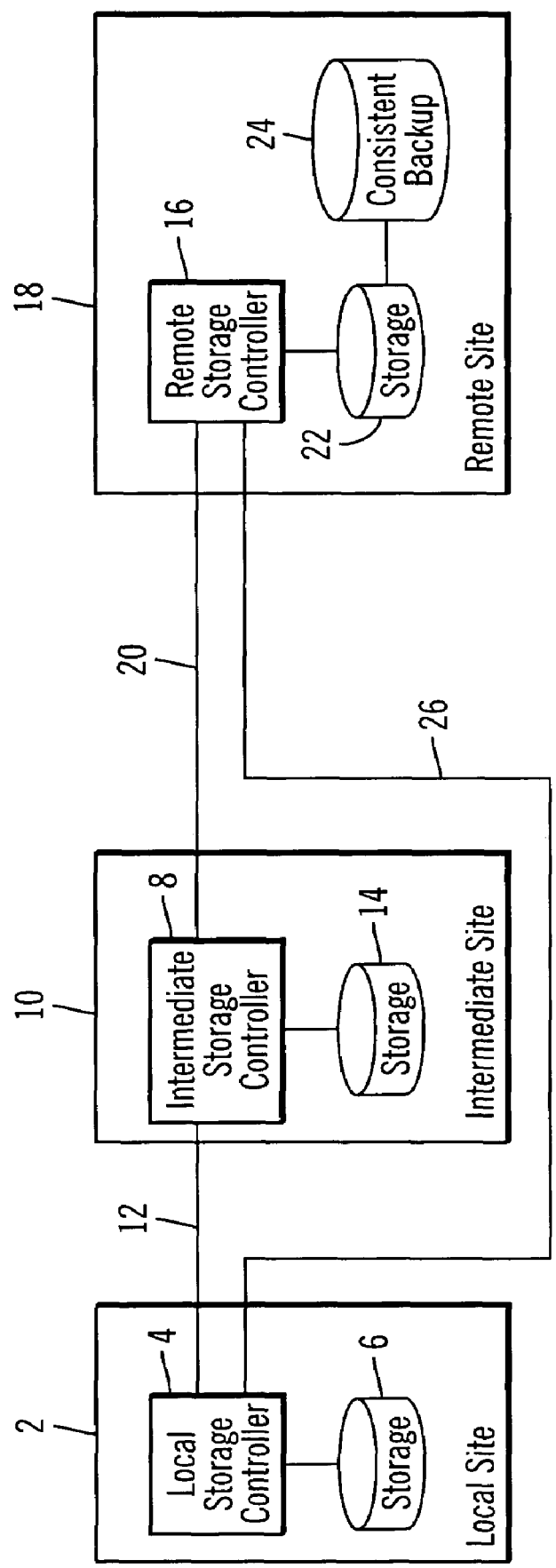
FIG. 1 is a block diagram illustrating a network computing environment in which aspects of the invention are implemented.

FIG. 1 illustrates a network computing environment in which aspects of the invention may be implemented. A local site 2 includes a local storage controller 4 coupled to an attached storage system 6 that manages Input/Output (I/O) access to volumes in the storage system 6 from host systems (not shown). The local storage controller 4 copies data to an intermediate storage controller 8 at an intermediate site 10 over communication line 12, wherein the intermediate storage controller stores updates from the local storage controller 4 in an attached intermediate storage system 14. The local storage controller 4 may copy data synchronously to the intermediate storage controller 8. The local site 2 and intermediate site 10 may be situated in a relatively close geographical area, such as a same building, different buildings in a same campus, a same city, etc.

The intermediate storage controller 8 would transmit updates received from the local storage controller 4 to a remote storage controller 16 at a remote site 18 over communication line 20. The remote storage controller 16 stores updates received at an attached remote storage system 22. In certain implementations, the intermediate storage controller 8 continuously and asynchronously transmits updates received from the local storage controller 4 data to the remote site 18, and at certain instances in time will ensure consistency of the data at the remote site 18. Further, the remote storage controller 16 may save a consistency group of data in the remote storage 22 to another storage, such as consistent backup storage 24 to maintain a backup copy of the consistent data at the remote site 18. The remote site 18 may be hundreds or thousands of miles from the local 2 and intermediate 10 sites.

The storage controllers 4, 8, and 16 further include a processor complex and may comprise any storage controller or server known in the art, such as the IBM Enterprise Storage Server (ESS), 3990 Storage Controller, etc. (Enterprise Storage Server is a registered trademark of IBM). The storage systems 6, 14, 22, and 24 may comprise an array of storage devices, such as Just a Bunch of Disks (JBOD), Redundant Array of Independent Disks (RAID) array, virtualization device, etc. The connections 12 and 20 may comprise separate dedicated lines or the connections may extend through a switched network, such as a Storage Area Network (SAN), Local Area Network (LAN), the Internet, an Intranet, etc. The connection 20 between the intermediate site 10 and remote site 18 may comprise long distance connections. Connection 26 provides a long distance connection between the local site 2 and the remote site 18.

Host systems (not shown) at the local site 2 may perform Input/Output (I/O) operations with respect to volumes in the storage system 6. The host systems may communicate with the storage controller 4 via any network or connection known in the art.

Figure 2:
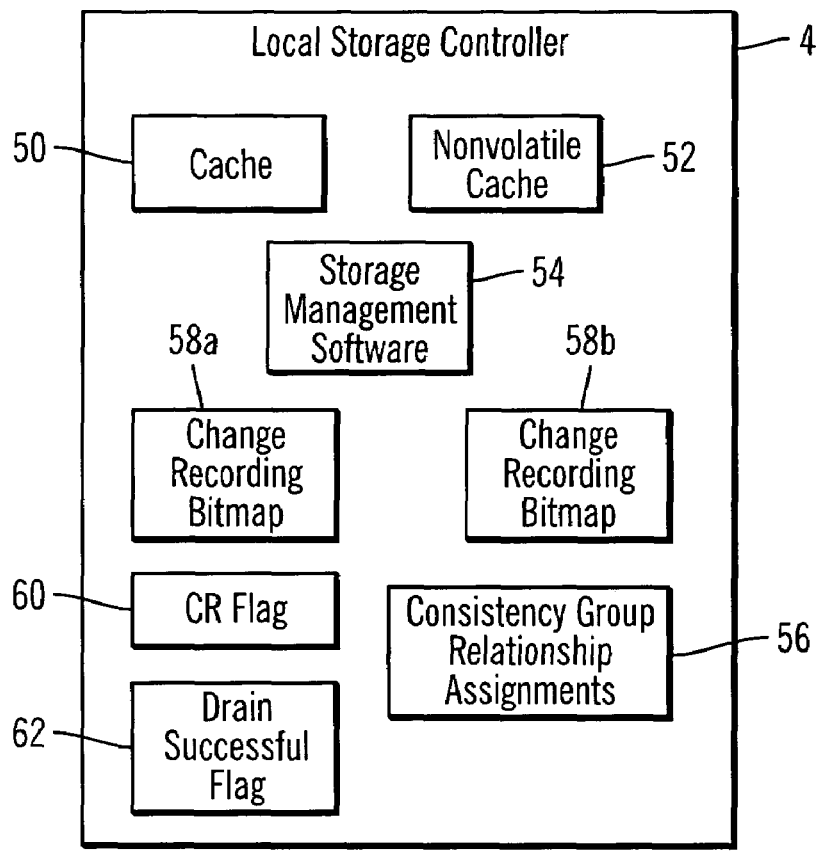
FIGS. 2 and 3 illustrate an arrangement of storage controllers in accordance with implementations of the invention.

FIG. 2 illustrates further detail of the local storage controller 4 as including a cache 50 in which updates to tracks in the attached storage 6 are maintained until written to the attached local storage 6 (i.e., the tracks are destaged). Additionally, the storage controller 4 includes a nonvolatile cache 52. The non-volatile cache 52 may be, for example, a battery-backed up volatile memory, to maintain a nonvolatile copy of data updates and other information. In certain implementations, the local storage controller 4 includes storage management software 54, consistency group relationship assignment information 56, and two change recording bitmaps 58a and 58b. The storage management software 54 would implement a read process for reading data, a write process for writing data and a synchronous process for synchronously transferring data from the local storage controller 4 to the intermediate storage controller 8. The consistency group relationship assignment information 56 indicates one or more consistency groups of volumes, where each consistency group has assigned volumes in the local storage 6 that are subject to a consistency group, so that data in the volumes may be mirrored at the intermediate and remote storages consistent as of points-in-time. For each consistency group of volumes, the storage management software 54 would maintain two change recording bitmaps 58a, 58b and a change recording flag 60, which indicates which change recording bitmap 58a, 58b is being used to indicate current updates to tracks in the local storage 6. A drain successful flag 62 indicates whether the mirroring of the last consistency group to the remote site 18 succeeded or failed. In alternative implementations, a set of change recording bitmaps 58a, 58b may be maintained for each volume to record activity for that volume, such that a plurality of sets of change recording bitmaps would be used to indicate updates to tracks in local storage for one consistency group having multiple volumes. Still alternatively, one set of change recording bitmaps 58a, 58b may indicate update tracks for multiple volumes assigned to one consistency group.

Figure 3:
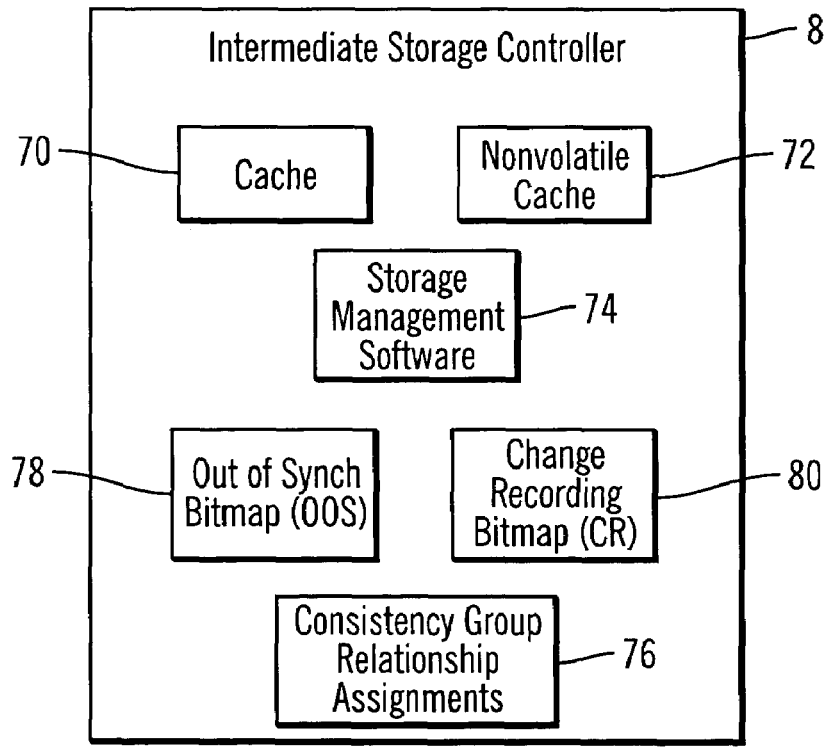

FIG. 3 illustrates further detail of the intermediate storage controller 8 as including a cache 70 in which updates to tracks in the attached intermediate storage 14 are maintained until written to the attached intermediate storage 14 (i.e., the tracks are destaged). Additionally, the storage controller 8 includes a nonvolatile cache 72, which may operate in the same manner as non-volatile cache 52 described above. The intermediate storage controller 8 further includes storage management software 74, consistency group relationship assignment information 76 providing the assignment of one or more volumes to one or more consistency groups, an out-of-synch bitmap (OOS) 78, and a change recording bitmap 80. The storage management software 74 would implement a read process for reading data, a write process for writing data and an asynchronous process for asynchronously transferring data from the intermediate storage 14 to the remote storage controller 16. The consistency group relationship assignment information 76 indicates one or more consistency groups of volumes, where each consistency group has assigned volumes in the intermediate storage 14 that are subject to a consistency group in the local storage controller 4, so that data in the volumes may be stored at the intermediate and remote storages consistent as of a point-in-time. The storage management software 74 may include code to allow for asynchronous copying of data, such as the code included in the IBM PPRC Extended Distance program, to allow for mirroring of data over relatively short and long distances. Further details of the IBM PPRC extended distance program are described in the IBM publication "IBM TotalStorage Enterprise Storage Server PPRC Extended Distance", having document no. SG24-6568-00 (Copyright IBM, June 2002), which publication is incorporated herein by reference in its entirety.

Further, the local storage management software 54 may include code to allow for long distance asynchronous copying from the local storage controller 4 to the remote storage controller 16 over communication line 26, which may comprise a long distance communication line, such as communication line 20. Further, communication line 20 and 26 may be part of the same physical connection or separate physical connections.

The out-of-synch bitmap 78 includes a bit for each track that the intermediate storage controller 8 is to copy over to the corresponding remote storage controller 16. During normal copy operations, any writes to the intermediate storage controller 8 are recorded in the out-of-synch bitmap (OOS) 78 and then copied over to the remote storage. The change recording bitmap 80 includes a bit for each track to which an update is received during the formation of a consistent set of data. The intermediate storage management software 74 would continually asynchronously copy the updated tracks in the OOS 78 to the remote storage controller 16. In response to receiving a command from the local storage controller 4 to form a consistency group, the intermediate storage controller 8, operating under control of the intermediate storage management software 74, would initialize the change recording bitmap 80 to indicate updates received after the consistency group formation time, and then copy all the updates indicated in the OOS 78. When all updates indicated in the OOS 78 have been asynchronously copied to the remote site 18, then the intermediate storage controller 8 may signal the local storage controller 4 of the completion of the remote mirroring of the consistency group.

In further implementations, the mirroring of data and consistency group management may occur on a session basis. A session may be defined as including multiple volumes that may be referenced using a session name when the session is started. In such case, a consistency group may be formed for all volumes in a session.

During the formation of a consistency group or at other times, the intermediate site 10 may fail. In such case, the local storage controller 4 would need to ensure that any updates the intermediate storage controller 8 failed to copy to the remote site 18 are mirrored at the remote site 18. Described implementations provide a technique for the local storage controller 4 to maintain information to recover from a failure at the intermediate site 10 without having to copy over all the data at the local site 4 to the remote site 18.

Figure 4:
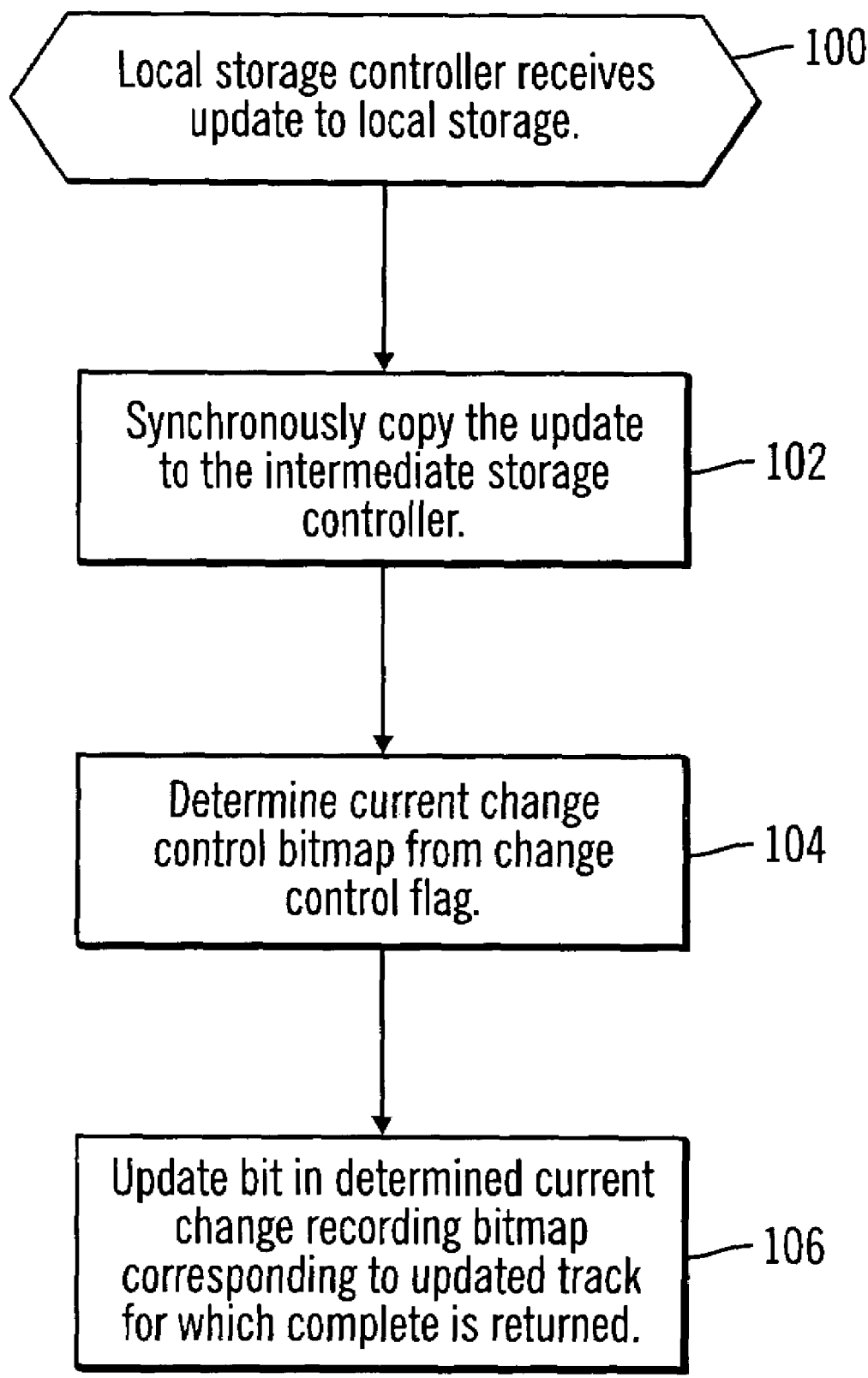

FIG. 4 illustrates operations performed by the local storage controller 4, in response to executing the storage management software 54, to handle an update to a track in the local storage 6. In response to receiving a write to the local storage 6 (at block 100), the update is synchronously copied (at block 102) to the intermediate storage controller 8 to store in the corresponding track in the intermediate storage 14. The current change recording bitmap 58a or 58b would be determined (at block 104) and the bit indicated in the bitmap 58a or 58b (which is indicated in the change recording flag 60) is set (at block 106) to "on". As discussed, the intermediate storage controller 8 would asynchronously copy tracks indicated in the OOS 78 as updated to the remote site 18 for storage in the remote storage 22.

Figure 5:
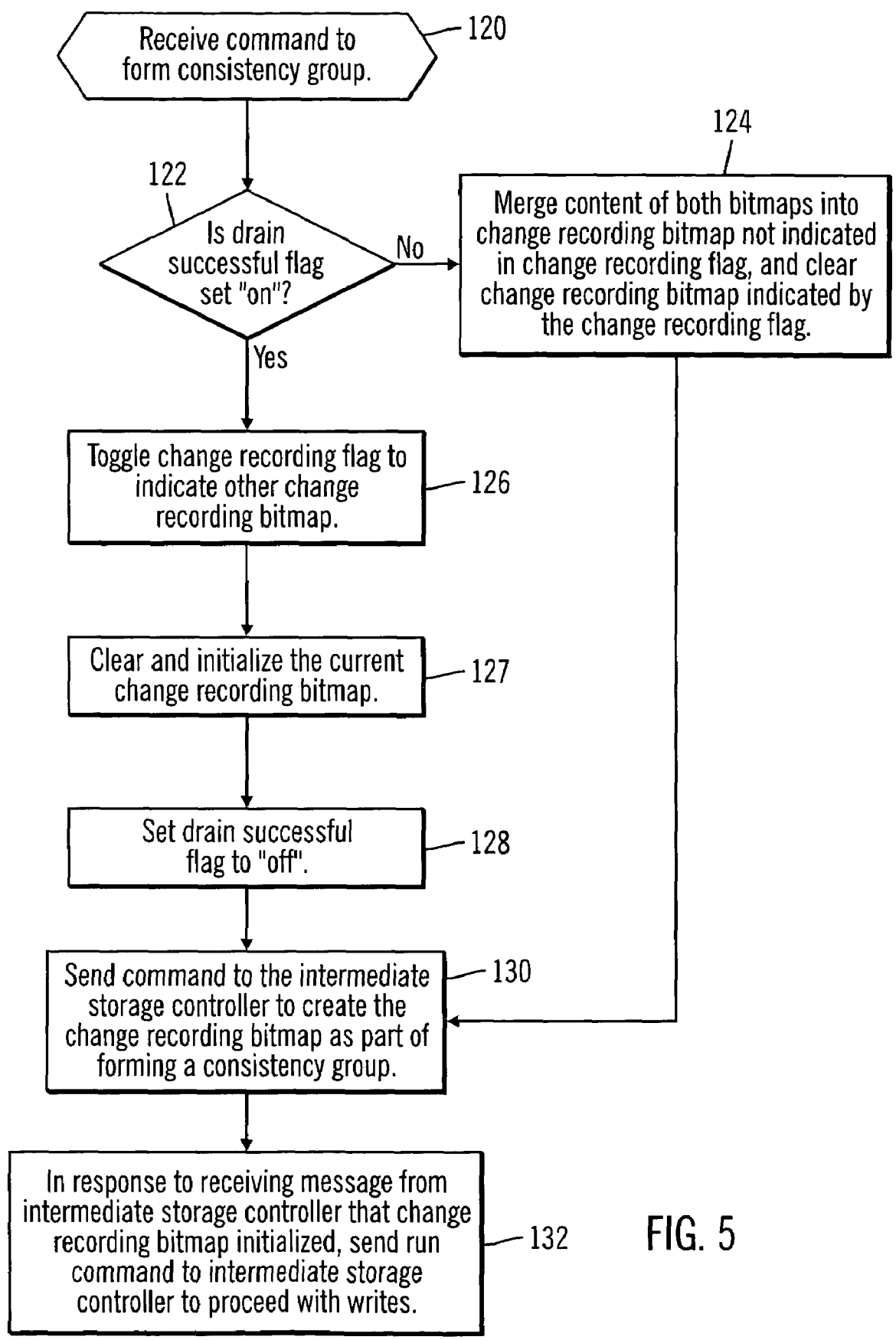

FIG. 5 illustrates operations performed by the local storage controller 4, in response to executing the storage management software 54, in response to receiving a command to initiate the formation of a consistency group of all updates at the local storage 6 as of the point-in-time of the consistency group. The command to form a consistency group may apply to a specific consistency group indicated in the relationship assignments 56, where there would be specific change recording bitmaps 58a, 58b, 80 and OOS 78 providing bitmaps for the tracks in the volumes subject to the consistency group relationship. Upon receiving (at block 120) the command to form a specified consistency group, the local storage controller 4 determines (at block 122) whether the drain successful flag 62 is "on", indicating whether intermediate storage controller 8 completed copying all tracks in the previous consistency group whose formation was attempted. If (at block 122) the flag 62 is "off", then the content of both bitmaps 58a and 58b is merged (at block 124) into the change recording bitmap not indicated in change recording flag 60, and the change recording bitmap indicated by the change recording flag 60 is cleared. In this way, the tracks from the previous consistency group and the updates to tracks received while the previous consistency group was being formed are merged into the change recording bitmap not indicated in the recording flag 60 to indicate all possible tracks that may still be in progress of being copied from the intermediate site 10 to the remote site 18. Occurrence of the situation at block 124 may indicate that the interval between requests for consistency group formation needs to expanded because insufficient time was provided for the last consistency group formation to complete.

If (at block 122) the previous consistency group formation completed, i.e., the drain successful flag 62 is set "on", then the change recording flag 60 is toggled (at block 126) to indicate the other change recording bitmap 58a or 58b as the current change recording bitmap 58a or 58b. In this way, the change recording bitmap 58a or 58b not indicated by the change recording flag 60 before the change includes the tracks to include in the consistency group formation and may also include tracks from prior attempted but failed consistency group formations. The new current change recording bitmap 58a or 58b identified by the toggled flag 60 is then cleared and initialized (at block 127) to indicate no updates for all tracks. The drain successful flag 62 is then set (at block 128) "off", indicating that the tracks for the current consistency group have not yet been mirrored from the intermediate site 10 to the remote site 18. From block 128 or 124, after the current change recording bitmap 58a or 58b indicated in the change recording flag 60 is ready to indicate updates received that are not part of the consistency group being formed in response to the command to form the consistency group, then the local storage controller 4 sends (at block 130) the command to form the consistency group to the intermediate storage controller 10 and create a change recording bitmap to record writes received while forming the consistency group. In response to receiving a message from the intermediate storage controller 8 that the change recording bitmap 80 has been initialized, the local storage controller transmits (at block 132) a run command to the intermediate storage controller 8 to proceed with writes. The run command and command to create the change recording bitmap would be sent by the process in the local storage management software 54 managing the formation of the consistency group. Moreover, the current change recording bitmap identified by the toggled flag 60 may also indicate tracks that are part of the consistency group for those tracks received after the local storage controller 4 toggles the flag 62 at block 126 and uses the new current change recording bitmap 58a or 58b to indicate writes but before sending the run command to the intermediate storage controller 8 at block 132 to use the intermediate change recording bitmap 80 to indicate updates received after the point-in-time of the consistency group 80.

Figure 6:
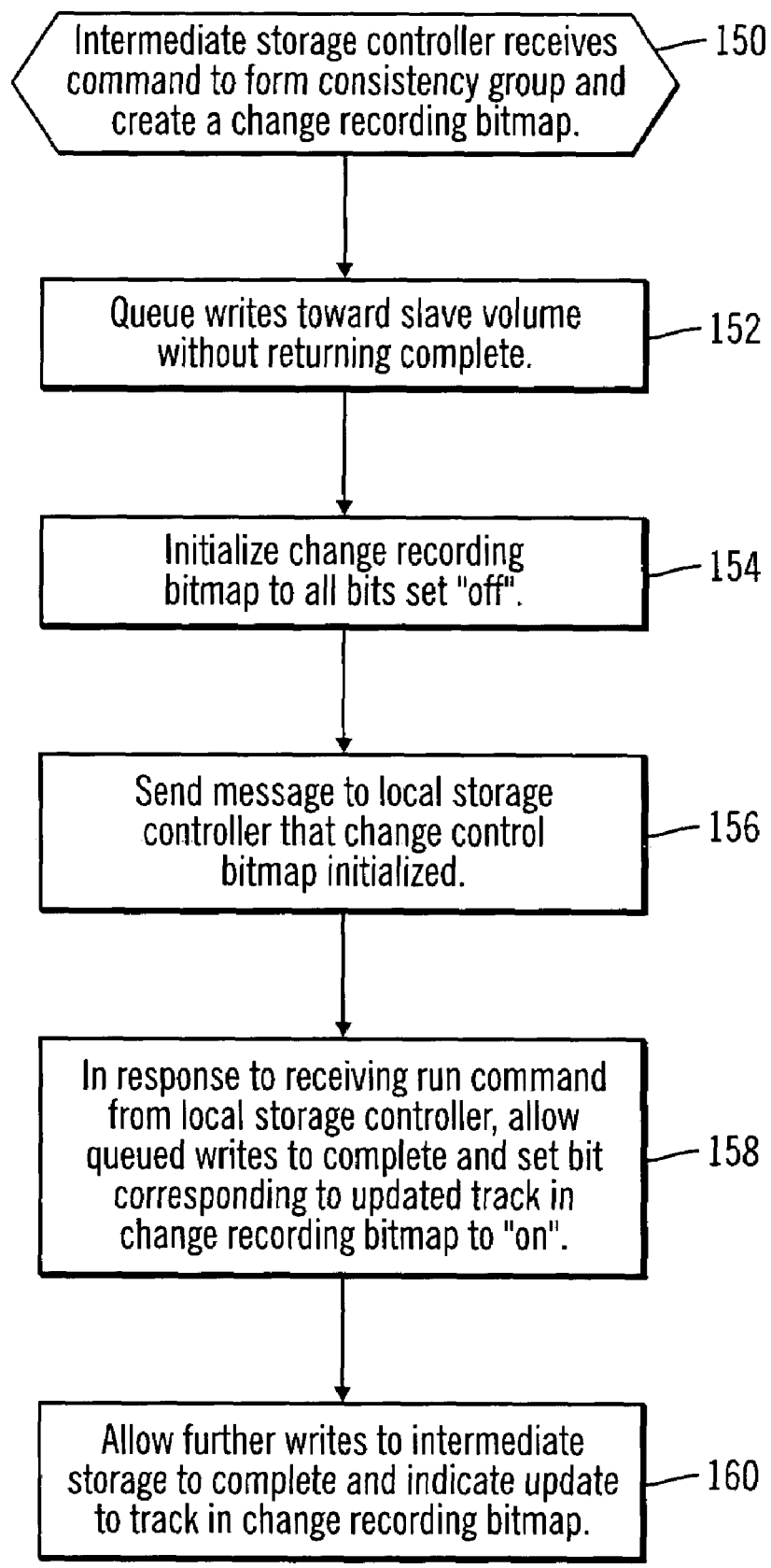

FIG. 6 illustrates operations performed by the intermediate storage controller 8, executing the storage management software 74, in response to receiving the command to form the consistency group and initialize the change recording bitmap 80. In response (at block 150) to receiving the command to form the consistency group, the intermediate storage controller 8 queues (at block 152) writes directed to the intermediate storage 14 without returning complete. The intermediate storage controller 8 initializes (at block 154) the change recording bitmap 80 to set all bits "off" and sends a message to the local storage controller 4 indicating the initialization of the intermediate change recording bitmap 80. In response to receiving the run command from the local storage controller 4, the intermediate storage controller 8 allows (at block 156) the queued writes to complete. The bits in the change recording bitmap 80 corresponding to the tracks updated by the queued writes are set (at block 158) to "on". In alternative implementations, the queued writes may be indicated in the OOS 78 instead of the change recording bitmap 80. Subsequent writes to the intermediate storage 8 may complete and the updated track would be indicated (at block 160) in the change recording bitmap 80.

FIG. 7 illustrates operations the intermediate storage controller 8 performs, when executing the storage management software 74, to asynchronously copy data to the remote site 18, which may occur as part of a background operation. The intermediate storage controller 8 asynchronously copies (at block 180) each track indicated in the OOS 78 to the remote storage controller 16 and sets the bit for the corresponding copied track in the OOS to 78 "off." After copying all the tracks indicated in the OOS 78 to the remote site 18, the intermediate storage controller 8 signals (at block 182) the local storage controller 4 that all tracks indicated in the OOS have been copied to complete the formation of the consistency group at the remote site 18 if the OOS 78 is currently involved in a consistency group formation. If the OOS 78 did not represent a volume included in a consistency group in the process of being formed, then there may be no notification to the master of the completion of the copying of the tracks for that OOS 78. The intermediate storage controller 8 then merges (at block 184) the bits of the change recording bitmap 80 into the OOS 78 so that the updates received while the consistency group was being formed may now be copied over to the remote site 18.

FIG. 8 illustrates operations performed by the local storage controller 4, when executing the storage management software 54, in response to receiving (at block 200) the signal from the intermediate storage controller 8 that the OOS 78 is drained, i.e., all tracks indicated in the OOS 78 have been mirrored to the remote site 18. The local storage controller 4 then sets (at block 202) the drain successful flag 62 is to "on" and a command is invoked (at block 204) to cause the remote storage controller 16 to make a copy of the consistency group data at the remote storage 22 to the consistent backup 24 when the last consistency group was formed. In certain implementations, the copy operation from the remote storage 22 to the consistent backup 24 may comprise a virtual copy operation, such as a FlashCopy® operation. A FlashCopy® operation involves establishing a logical point-in-time relationship between source and target volumes on the same or different devices and then subsequently copying the data subject to the relationship from the source to target volumes. The FlashCopy® operation guarantees that until a track in a FlashCopy® relationship has been hardened to its location on the target disk, the track resides on the source disk. The command to initiate the FlashCopy or other virtual copy operation may originate from the master storage controller or some other process at the local 2 or other site.

Figure 9:
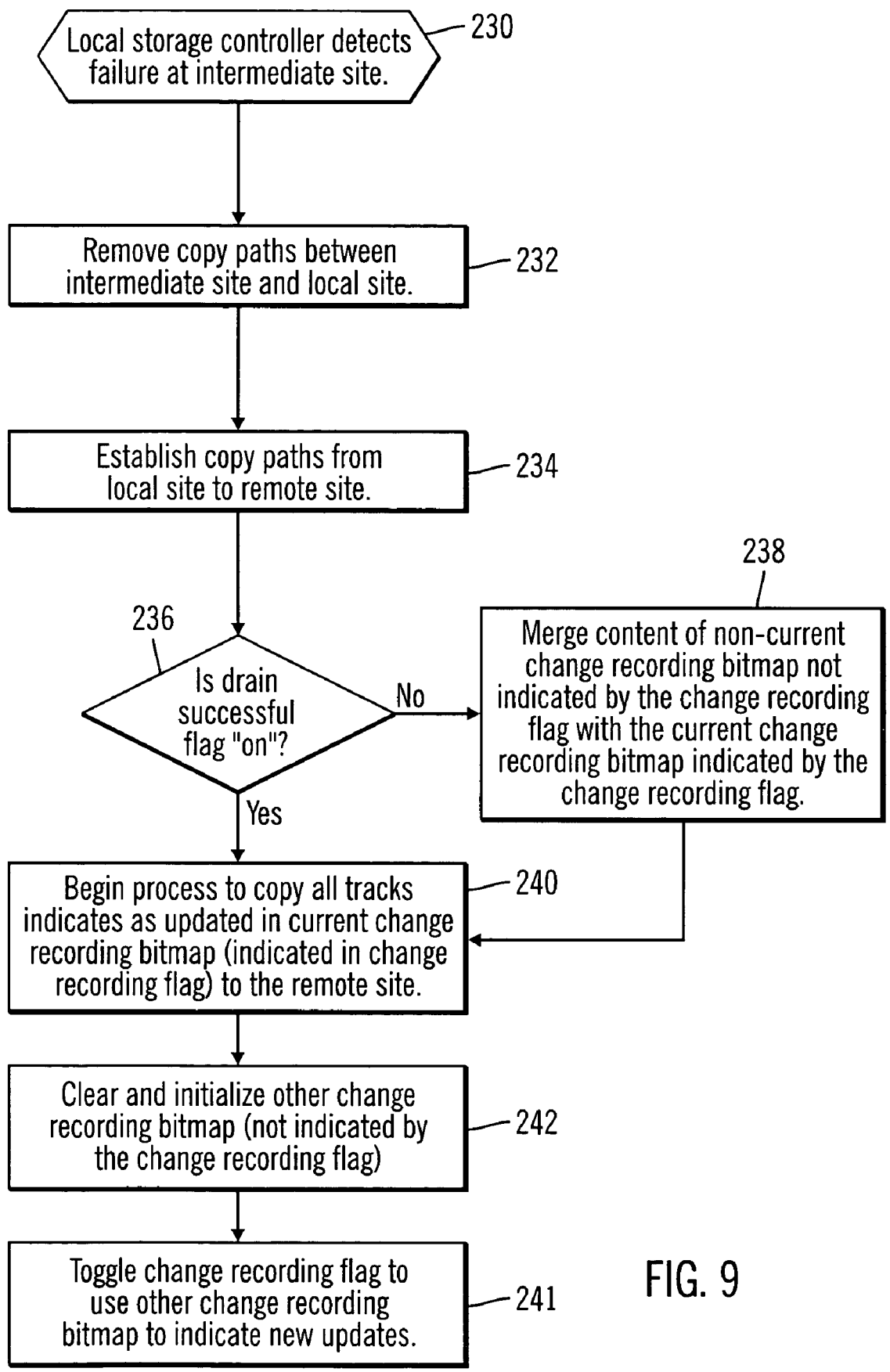

FIG. 9 illustrates operations the local storage controller 4 performs upon detecting (at block 230) a failure at the intermediate site 10 which prevents the intermediate site 10 from completing the mirroring of updates to the remote site 18. In response, the copy paths between the intermediate site 10 and the local site 2, implemented in communication line 12, are removed (at block 232) and copy paths from the local storage controller 4 to the remote storage controller 16 are established (at block 234) via communication line 26. The removal and establishment of paths may involve logical paths as opposed to physical paths, where removal and establishment of the logical paths may not involve changes to the physical hardware in which the logical paths are implemented. If (at block 236) the drain successful flag is "off", indicating that the last consistency group was not successfully mirrored at the remote site 18, then the content of the non-current change recording bitmap 58*a* or 58*b* indicating the updates that are part of the consistency group (i.e., the bitmap not indicated by the change recording flag 60) is merged (at block 238) with the current change recording bitmap 58*a* or 58*b* indicating updates received following the formation of the consistency group (indicated by the change recording flag 60). In this way, the merged change recording bitmap indicates the updates received following the consistency group formation and the updates that are part of the consistency group being formed. After the current change recording bitmap indicates all tracks that may not have been copied from the intermediate site 10 to the remote site 18 when the failure was detected (from the yes branch of block 236 or block 238), then the local storage controller 4 begins (at block 240) the process to copy all tracks indicated as updated in the current change recording bitmap (indicated in change recording flag) to the remote site. In alternative implementations, the local storage controller 4 may maintain a local out-of-synch bitmap (not shown) to indicate tracks to copy to the remote site 18. The local storage controller 4 would further initialize and clear (at block 242) the change recording bitmap 58*a* or 58*b* not indicated by the change recording flag 60 as the current one and then toggle (at block 242) the change recording flag 60 to use the just cleared change recording bitmap from which the data was merged as the change recording bitmap to indicates subsequently received updates.

With certain described implementations, the local storage controller 4 only copies over tracks from the local storage 6 indicated in one or both of the change recording bitmaps 58*a*, 58*b* to the remote site 18, which are the tracks at the intermediate site 10 that could have been in progress (in-flight) of being copied over to the remote site 18 when the detected failure occurs. In this way, the local storage controller 4 avoids having to copy over all tracks in the local storage 6 to ensure consistency at the remote site 18 after failure at the intermediate site 10.

ADDITIONAL IMPLEMENTATION DETAILS

The described techniques to copy data may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations were described with respect to the IBM Asynchronous Cascading PPRC computing environment. However, the described implementations for maintaining consistency could be applied to maintain consistency in other computing and vendor environments and using other data copying protocols and programs than described herein.

In certain implementations, data in the storage devices is arranged in volumes. In alternative systems, the storage areas on which data is maintained may be grouped according to storage units other than volumes that are grouped in groupings other than sessions for the purpose of maintaining consistency.

In additional implementations, the intermediate storage controller may comprise one of many slave storage controllers managed by a single master storage controller to form a consistency group at a remote site as disclosed in the commonly assigned and copending patent application entitled "Method, System, and Program For Forming a Consistency Group", Ser. No. 10/676,852, which patent application is incorporated herein by reference in its entirety and filed on the same date hereof.

In described implementations, the storage units in the storage systems 6, 14, 22, and 24 comprised volumes. In alternative implementations, other storage unit values may be assigned to a consistency group, where such storage units may comprise tracks in a volume, blocks, logical subsystems, logical drives, or any other physical or logical storage unit designation known in the art.

In described implementations, data updates were organized in consistency groups before being transferred from one storage controller to another. In alternative implementations, the data copied between the different storage controllers may not comprise a consistency group.

The described operations for forming a consistency group may be used in a critical data environment where high availability is paramount. However, those skilled in the art will appreciate that the point-in-time copy operations described herein may apply to storage systems used for non-critical data where high availability is not absolutely necessary.

In the described implementations, each storage controller copies data to a corresponding remote storage controller having an attached remote storage system. In alternative implementations, multiple storage controllers at the local or intermediate site may copy data to one remote storage controller, where a single remote storage controller may receive point-in-time data from multiple local or intermediate storage controllers.

In described implementations, the intermediate site is closer to the local storage site than the remote storage site. In alternative implementations, the local, intermediate and remote sites may be separated by different distances than described herein.

The illustrated logic of FIGS. 4–9 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 10:
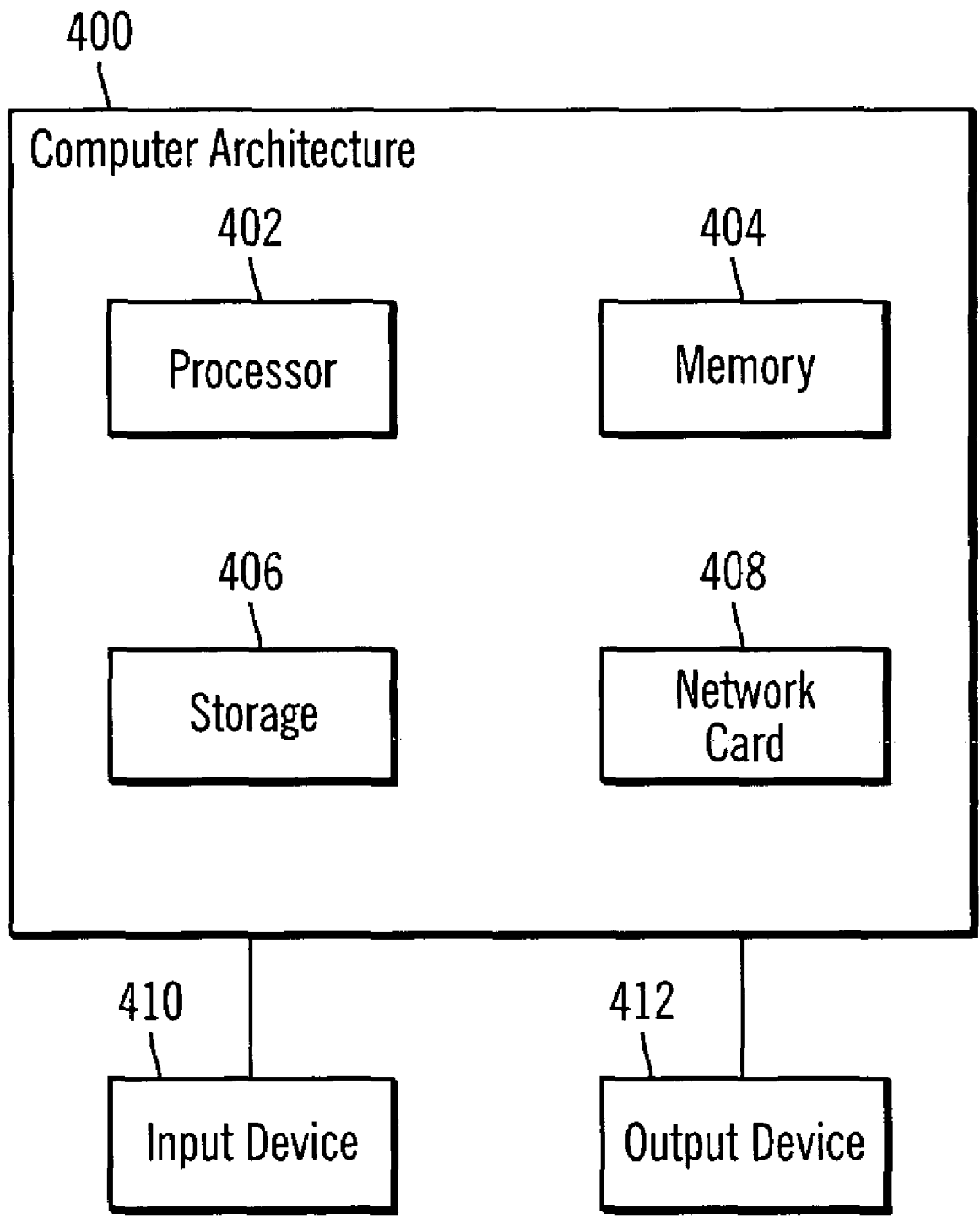
FIG. 10 illustrates an architecture of computing components in the network environments, such as the storage controllers, used with implementations of the invention.

FIG. 10 illustrates one implementation of a computer architecture 400 of the network components, such as the storage controllers shown in FIG. 1. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for forming a consistency group of data, comprising:
receiving a command to form a consistency group with respect to data received at a first storage site that is mirrored to a second storage site;
providing a first data structure indicating updates to the first storage site not included in the consistency group that are received after the command;
providing a second data structure indicating updates to the first storage site in the consistency group to be formed;
transmitting a command to cause data copied to the second storage site that is part of the consistency group to be copied to a third storage site;
receiving indication when the data in the second storage site that is part of the consistency group is copied to the third storage site;
maintaining a flag indicating which of the first and second data structures to use to indicate updates received after the command to form the consistency group; and
toggling the flag to indicate the first or second data structure not currently indicated by the flag, wherein the flag identifies the first or second data structure that indicates updates to the first storage site not included in the consistency group.

2. The method of claim 1, further comprising:
detecting a failure at the second storage site;
determining whether the data in the consistency group was copied to the third storage site; and
copying the updates at the first storage site indicated in the first data structure to the third storage site after determining that the data in the consistency group was copied to the third storage site.

3. The method of claim 2, farther comprising:
copying the data at the first storage site indicated in the first and second data structures to the third storage site after determining that the data in the consistency group was not copied to the third storage site.

4. The method of claim 3, further comprising:
merging data indicated in the first and second data structures into either of the first or second data structure to indicate data in the consistency group that needs to be copied to the third storage site, wherein the other of the first or second data structure into which the data is not merged is used to indicate updates to data that is not in the consistency group.

5. The method of claim 1, further comprising:
synchronously copying updates from the first storage site to the second storage site, wherein the first and second data structures indicate updates to the first storage site that were successfully synchronously copied to the second storage site.

6. The method of claim 1, wherein the first and second storage sites are separated by a first distance and the second and third storage sites are separated by a second distance, wherein the second distance is substantially greater than the first distance.

7. A method for forming a consistency group of updates received at a first storage site, comprising:
receiving at a second storage site updates from the first storage site;
providing a first data structure indicating updates at the second storage site to copy to a third storage site;
receiving a command to form a consistency group;
using a second data structure at the second storage site to indicate updates received from the first storage site after receiving the command that are not included in the consistency group to be formed; and
signaling the first storage site in response to copying the updates in the consistency group indicated in the first data structure to a third storage site.

8. The method of claim 7, further comprising:
merging indications of updates in the first and second data structures into the first data structure in response to copying the updates in the consistency group indicated in the first data structure to the third storage site; and indicating in the second data structure updates from the first storage site received after merging the first and second data structures.

9. The method of claim 7, further comprising:
continuously asynchronously copying the updates indicated in the first data structure to the third storage site.

10. The method of claim 7, further comprising:
determining whether the second data structure is being used to indicate updates from the first storage site not in one consistency group in response to receiving the command to form the consistency group;
merging indications of updates in the first and second data structures in the first data structure in response to receiving the command to form the consistency group and determining that the second data structure is being used to indicate updates from the first storage site not in one consistency group; and
indicating in the second data structure updates from the first storage site received after merging the first and second data structures.

11. A system for forming a consistency group of data at a first storage that is in communication with a second storage site, comprising:
a computer readable medium;
means for receiving a command to form a consistency group with respect to data received at the first storage site that is mirrored to the second storage site;
means for providing a first data structure in the computer readable medium indicating updates to the first storage site not included in the consistency group that are received after the command;
means for providing a second data structure in the computer readable medium indicating updates to the first storage site in the consistency group to be formed;
means for transmitting a command to cause data copied to the second storage site that is part of the consistency group to be copied to a third storage site;
means for receiving indication when the data in the second storage site that is part of the consistency group is copied to the third storage site;
means for maintaining a flag in the computer readable medium indicating which of the first and second data structures to use to indicate updates received after the command to form the consistency group; and
means for toggling the flag to indicate the first or second data structure not currently indicated by the flag, wherein the flag identifies the first or second data structure that indicates updates to the first storage site not included in the consistency group.

12. The system of claim 11, further comprising:
means for detecting a failure at the second storage site;
means for determining whether the data in the consistency group was copied to the third storage site; and
means for copying the updates at the first storage site indicated in the first data structure to the third storage site after determining that the data in the consistency group was copied to the third storage site.

13. The system of claim 12, further comprising:
means for copying the data at the first storage site indicated in the first and second data structures to the third storage site after determining that the data in the consistency group was not copied to the third storage site.

14. The system of claim 13, further comprising:
means for merging data indicated in the first and second data structures into either of the first or second data structure to indicate data in the consistency group that needs to be copied to the third storage site, wherein the other of the first or second data structure into which the data is not merged is used to indicate updates to data that is not in the consistency group.

15. The system of claim 11, further comprising:
means for synchronously copying updates from the first storage site to the second storage site, wherein the first and second data structures indicate updates to the first storage site that were successfully synchronously copied to the second storage site.

16. The system of claim 11, wherein the first and second storage sites are separated by a first distance and the second and third storage sites are separated by a second distance, wherein the second distance is substantially greater than the first distance.

17. A system for forming a consistency group of updates received at a first storage site, wherein the system is located at a second storage site in communication with the first storage site, comprising:
a computer readable medium;
receiving at a second storage site updates from the first storage site;
providing a first data structure in the computer readable medium indicating updates at the second storage site to copy to a third storage site;
receiving a command to form a consistency group;
using a second data structure in the computer readable medium to indicate updates received from the first storage site after receiving the command that are not included in the consistency group to be formed; and
signaling the first storage site in response to copying the updates in the consistency group indicated in the first data structure to a third storage site.

18. The system of claim 17, further comprising:
means for merging indications of updates in the first and second data structures into the first data structure in response to copying the updates in the consistency group indicated in the first data structure to the third storage site; and
means for indicating in the second data structure updates from the first storage site received after merging the first and second data structures.

19. The system of claim 17, further comprising:
means for continuously asynchronously copying the updates indicated in the first data structure to the third storage site.

20. The system of claim 17, further comprising:
means for determining whether the second data structure is being used to indicate updates from the first storage site not in one consistency group in response to receiving the command to form the consistency group;
means for merging indications of updates in the first and second data structures in the first data structure in response to receiving the command to form the consistency group and determining that the second data structure is being used to indicate updates from the first storage site not in one consistency group; and
means for indicating in the second data structure updates from the first storage site received after merging the first and second data structures.

21. A computer readable medium including code executed by a processor complex to form a consistency group of data, wherein the computer readable medium is implemented at a first storage site in communication with a second storage site, and wherein the code causes operations to be performed at the first storage site, the operations comprising:

receiving a command to form a consistency group with respect to data received at a first storage site that is mirrored to the second storage site;

providing a first data structure indicating updates to the first storage site not included in the consistency group that are received after the command;

providing a second data structure indicating updates to the first storage site in the consistency group to be formed;

transmitting a command to cause data copied to the second storage site that is part of the consistency group to be copied to a third storage site;

receiving indication when the data in the second storage site that is part of the consistency group is copied to the third storage site;

maintaining a flag indicating which of the first and second data structures to use to indicate updates received after the command to form the consistency group; and toggling the flag to indicate the first or second data structure not currently indicated by the flag, wherein the flag identifies the first or second data structure that indicates updates to the first storage site not included in the consistency group.

22. The computer readable medium of claim 21, wherein the operations further comprise:

detecting a failure at the second storage site;

determining whether the data in the consistency group was copied to the third storage site; and copying the updates at the first storage site indicated in the first data structure to the third storage site after determining that the data in the consistency group was copied to the third storage site.

23. The computer readable medium of claim 22, wherein the operations further comprise:

copying the data at the first storage site indicated in the first and second data structures to the third storage site after determining that the data in the consistency group was not copied to the third storage site.

24. The computer readable medium of claim 23, wherein the operations further comprise:

merging data indicated in the first and second data structures into either of the first or second data structure to indicate data in the consistency group that needs to be copied to the third storage site, wherein the other of the first or second data structure into which the data is not merged is used to indicate updates to data that is not in the consistency group.

25. The computer readable medium of claim 21, wherein the operations further comprise:

synchronously copying updates from the first storage site to the second storage site, wherein the first and second data structures indicate updates to the first storage site that were successfully synchronously copied to the second storage site.

26. The computer readable medium of claim 21, wherein the first and second storage sites are separated by a first distance and the second and third storage sites are separated by a second distance, wherein the second distance is substantially greater than the first distance.

27. A computer readable medium including code executed by a processor complex to form a consistency group of updates received at a first storage site, wherein the computer readable medium is implemented in a second storage site in communication with the first storage site, and wherein the code causes operations to be performed at the second storage site, the operations comprising:

receiving at a second storage site updates from the first storage site;

providing a first data structure indicating updates at the second storage site to copy to a third storage site;

receiving a command to form a consistency group;

using a second data structure at the second storage site to indicate updates received from the first storage site after receiving the command that are not included in the consistency group to be formed; and signaling the first storage site in response to copying the updates in the consistency group indicated in the first data structure to a third storage site.

28. The computer readable medium of claim 27, wherein the operations further comprise:

merging indications of updates in the first and second data structures into the first data structure in response to copying the updates in the consistency group indicated in the first data structure to the third storage site; and indicating in the second data structure updates from the first storage site received after merging the first and second data structures.

29. The computer readable medium of claim 27, wherein the operations further comprise:

continuously asynchronously copying the updates indicated in the first data structure to the third storage site.

30. The computer readable medium of claim 27, wherein the operations further comprise:

determining whether the second data structure is being used to indicate updates from the first storage site not in one consistency group in response to receiving the command to form the consistency group;

merging indications of updates in the first and second data structures in the first data structure in response to receiving the command to form the consistency group and determining that the second data structure is being used to indicate updates from the first storage site not in one consistency group; and indicating in the second data structure updates from the first storage site received after merging the first and second data structures.

* * * * *